Patented Oct. 29, 1946

2,410,072

UNITED STATES PATENT OFFICE 2,410,072

ALKYLATION OF ISOBUTANE WITH PROPYLENE

Aaron W. Horton, Detroit, Mich., and John W. Brooks, Wenonah, and Arlie A. O'Kelly, Woodbury, N. J., assignors to Socony-Vacuum Oil Company, Incorporated, a corporation of New York No Drawing. Application September 17, 1943, Serial No. 502,813

15 Claims. (Cl. 260—683.4)

This invention relates to the alkylation of isobutane with propylene and is more particularly concerned with the production of high octane motor fuel by the catalytic alkylation of isobutane with propylene.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available as well as engineering considerations such as initial and operation costs; their essential feature being that in the course of treating the materials, the olefinic hydrocarbons produced in the earlier stages of the process, are eventually polymerized to gasoline. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked to olefinic hydrocarbon gases and these gases are subsequently passed with naphtha through a polymerizing and reforming still. In some instances, the processes involve the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, called the paraffinic reactant, and an olefinic hydrocarbon, called the olefinic reactant, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons and the occurrence of side reactions, including polymerization of the olefinic reactant, under high temperature conditions, that substantially reduce the purity of the product obtained.

Alkylation may be conducted at high temperatures and pressures, on the order of over 900° F. and over 4000 pounds per square inch gauge, respectively; or may be conducted in the presence of alkylation catalysts at lower temperatures and pressures, thereby assuring a high yield of desired alkylate by avoiding extensive degradation of the reactants, the occurrence of side and secondary reactions, and appreciable polymerization of the olefinic reactant. The two methods are known as thermal alkylation and as catalytic alkylation, respectively.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system, during the alkylation operation. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic action of these alkylation catalysts. Accordingly, several processes have been proposed wherein small amounts of these promoters, on the order of about 1% to 3% by weight on the charge, are added to the catalysts to promote their alkylation catalytic activity.

A copending application (Ser. No. 502,018, filed September 11, 1943) in which one of the inventors of the present application is coinventor, is directed to the process of alkylating paraffinic and isoparaffinic hydrocarbons with olefinic hydrocarbons, which comprises contacting a paraffinic or isoparaffinic hydrocarbon and an olefinic hydrocarbon in a reaction zone under alkylating conditions with small or promoter amounts of what has been termed therein, a homogeneous gaseous phase alkylation catalyst consisting essentially of a material that forms with the hydrocarbon reactants, a single homogeneous gaseous phase under the alkylation conditions of the reaction zone. The alkylation conditions of the process of this copending application, comprise a broad temperature range of about 590° F. to about 850° F., preferably, about 650° F. to about 825° F., and pressures of at least 500 pounds per square inch gauge. Although isobutane can be alkylated with propylene in accordance with the process of this copending application, the yield of desired alkylate was not of the same magnitude, as for instance, the yield of desired alkylate obtained with the isobutane-ethylene reaction.

We have found that isobutane may be alkylated with propylene to produce high yields of high octane gasoline by using small or promoter amounts of alkylation catalysts that form with the isobutane and propylene, a single homogeneous gaseous phase under alkylating conditions that comprise a narrow and critical temperature range.

We have also found that when isobutane is alkylated with propylene in the presence of homogeneous gaseous phase alkylation catalysts under the alkylating conditions of our process, the alkylate obtained includes constituents that are entirely different from the constituents of the hydrocarbon alkylate obtained in the alkylation of isobutane with propylene in the presence of known heterogeneous alkylation catalysts, i. e., AlCl₃, H₂SO₄, and the like. Thus, when heterogeneous alkylation catalysts are used, 2,3-dimethylpentane and 2,4-dimethylpentane are important constituents of the hydrocarbon alkylate obtained. On the other hand, in our process, triptane or 2,2,3-trimethylbutane, 2,2-dimethylpentane, and 2-methylhexane are the predominant constituents of the hydrocarbon alkylate.

It is possible to postulate the formation of these three compounds obtained in accordance with the process of our invention as follows:

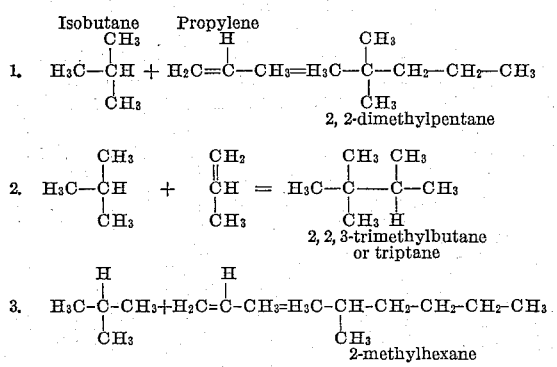

From a motor fuel standpoint, the 2,2-dimethylpentane produced by the first reaction has an octane number of about 80 C. F. R. motor method; the triptane produced by the second reaction has an octane number of well over 100; and the 2-methylhexane obtained in the third reaction, has an octane number of about 45. In view of the foregoing, in the manufacture of high octane motor fuel by the alkylation of isobutane with propylene, alkylation conditions that favor the production of triptane obviously are preferable. Further, since neohexane which may be produced by the alkylation of isobutane with ethylene, has an octane number of 93.4, and since 2,3-dimethylpentane and 2,4-dimethylpentane which are the predominant constituents of the alkylate obtained in the alkylation of isobutane with propylene in the presence of heterogeneous alkylation catalysts, as noted hereinbefore, have octane numbers of 80 and 82, respectively, the importance of the alkylation of isobutane with propylene in the presence of homogeneous gaseous phase alkylation catalysts under alkylating conditions that favor the production of triptane is manifest.

In actual practice, it is impossible to obtain triptane exclusively, appreciable amounts of 2,2-dimethylpentane and 2-methylhexane being always formed. Also, there are other side reactions that account for a substantial portion of the total alkylate.

It is an object of the present invention to provide an efficient process for catalytically alkylating isobutane with propylene. Another object of the present invention is to provide an efficient process for catalytically alkylating isobutane with propylene to produce high yields of high octane gasoline. A more specific object is to provide a process for catalytically alkylating isobutane with propylene under alkylating conditions adapted to produce triptane or 2,2,3-trimethylbutane. A very important object of our invention is to afford a process capable of carrying out the above objects by using an alkylation catalyst that forms with the isobutane and propylene, a single homogeneous gaseous phase during the alkylation operation. Other objects and advantages of the present invention will become apparent to those skilled in the art from the following description.

Broadly stated, the present invention provides a process for alkylating isobutane with propylene which comprises contacting isobutane and propylene in a reaction zone under closely controlled alkylating conditions, with small or promoter amounts of an alkylation catalyst consisting essentially of a material that forms with the hydrocarbon reactants, a single homogeneous gaseous phase under the closely controlled alkylation conditions of the reaction zone, the closely controlled alkylating conditions including a critical temperature range.

An important feature of the process of the present invention is the relatively low temperature that may be used. As a result, degradation of the isobutane and propylene in the charge to low molecular weight hydrocarbons and the pronounced occurrence of side reactions including polymerization of the propylene are avoided to an appreciable extent. Consequently, in our process, we obtain high yields of a high grade product that is almost entirely paraffinic in nature and is substantially free from impurities.

Another important feature of the present invention is the fact that, contrary to known catalytic processes of the prior art for alkylating isobutane with propylene, in which the isobutane and propylene being processed form with the alkylation catalysts, a heterogeneous system during the alkylation operation, the alkylation process of our invention employs alkylation catalysts consisting essentially of materials that form with the isobutane and propylene being processed, a single homogeneous gaseous phase under alkylating conditions. The alkylation catalysts of the present invention may be called, therefore, homogeneous gaseous phase catalysts in contradistinction to the alkylation catalysts of the prior art which may be referred to as heterogeneous catalysts. Accordingly, as a result of the catalyst being in the same phase or state as the isobutane and propylene being processed, fouling of the catalyst is substantially eliminated and agitation and/or mixing problems are non-extant. Further, since the catalytic activity of alkylation catalysts appears to be predicated somewhat upon contact between the catalysts and the gaseous hydrocarbon reactants at the interfaces therebetween, it follows that the catalytic efficiency of a given catalyst increases with the increase in area of interfacial contact, other variables remaining constant. Hence, since the homogeneous gaseous phase catalysts of our process inherently furnish the greatest possible "interfacial contact" between the catalyst and the isobutane and propylene under the conditions of alkylation, efficient catalytic activity with a concomitant high yield of high grade alkylate is achieved using relatively small amounts of homogeneous gaseous phase catalyst.

In view of the foregoing, an operation feature of the process of the present invention that is of considerable practical importance, is that small or promoter amounts of alkylation catalysts are used. These amounts are so small that the catalyst may be discarded feasibly, thereby obviating recovery and regeneration problems and eliminating high initial and operation costs.

A most important feature of the present invention is that high yields of high octane motor fuel are obtained by alkylating isobutane with propylene in the presence of small or promoter amounts of homogeneous gaseous phase catalysts under alkylation conditions that include a critical temperature range which favors higher yields of triptane and of 2,2-dimethyl pentane than of 2-methyl hexane.

As disclosed in application Ser. No. 502,018, filed September 11, 1943, the homogeneous gaseous phase alkylation catalysts of the present invention may be solids, liquids or gases under normal conditions. However, it is likewise essential for the purposes of the present invention, that the catalyst form with the isobutane and propylene, a single homogeneous gaseous phase under the alkylation conditions of the process. Organic halogen compounds have been found to be very effective catalysts of this type. These organic halogen compound catalysts comprise halogen derivatives of hydrocarbons, wherein halogens have been substituted for part or all the hydrogen of an organic compound. Generally speaking, the preferred catalysts of the present invention are halogen derivatives of hydrocarbons wherein a halogen or halogens are substituted onto a non-ring portion, if any, of the hydrocarbon, and particularly, halogen derivatives of hydrocarbons that are relatively unstable such as tertiary butyl halides; the efficiency of the catalysts apparently being somewhat in proportion to the ease with which they give up hydrogen halide during alkylation. We especially prefer to use as our catalysts organic bromine compounds. We have found that when bromine derivatives of hydrocarbons are used as homogeneous catalysts in the process of the present invention, the alkylate contains an appreciably larger proportion of the tripane- and 2,2-dimethylpentane-containing fraction. Isobutylene dibromide is particularly effective in this respect. However, when organic bromine compounds are used, the concentration of the triptane in the triptane- and 2,2-dimethylpentane-containing fraction is always lower. The higher yield of 2,2-dimethylpentane thus obtained, is accompanied by a decrease in the 2-methylhexane. Therefore, since it would thus appear that organic bromine compounds catalysts favor the first and second alkylation reactions, referred to hereinbefore; while the organic chlorine compounds favor the first and third alkylation reactions referred to; and since the first and second reactions produce products that have the highest and higher octane numbers, respectively, the advantages of employing organic bromine compounds as homogeneous alkylation catalysts for the manufacture of high octane motor fuel by our process, are manifest. By way of illustrative example, it is possible to obtain a fraction, using isobutylene dibromide as a catalyst, containing 10 parts of triptane, 85 parts of 2,2-dimethylpentane and only 5 parts 2-methylhexane. This fraction is considerably larger per pass when isobutylene dibromide is employed, than when propylene dichloride is used as the catalyst. The overall per pass yield of triptane is thus slightly increased while the overall per pass yield of 2,2-dimethylpentane is increased appreciably. Therefore, even though the yield of triptane is only slightly increased, it still seems favorable to produce 80 octane 2,2-dimethylpentane at the expense of 45 octane 2-methylhexane.

Specific homogeneous catalysts suitable for our process that may be mentioned by way of non-limiting example are: 1,2,3-tribromopropane; propylene dibromide; propylene tribromide; dibromoisobutane; tertiary monobromobutane; ethyl bromide; 1,2,3-trichloro propane; propylene dichloride; dichloro-difluoro methane; dichlormonofluoro methane; dichloroisobutane; isobutylene dichloride; and so forth. It is to be understood, of course, that free halogens or hydrogen halides, reacting with hydrocarbons, can be used to form our homogeneous catalysts in situ.

Certain nitro organic compounds, heterocyclic oxygen compounds and elemental halogens as well as certain organic halides containing a nitrogroup have been found also to be very effective homogeneous gaseous phase catalysts. Nitromethane, propylene oxide, bromine and chlorine, and 1-chloro nitropropane may be mentioned by way of non-limiting examples. These types of homogeneous gaseous phase catalysts form the subject matter of separate applications for Letters Patent, namely, Ser. No. 508,062, filed October 28, 1943; Ser. No. 513,720, filed December 10, 1943; Ser. No. 502,812, filed September 17, 1943.

The amount of homogeneous gaseous phase catalyst used in our process varies between about 0.5% and about 3%, and preferably, between about 1% and about 1.25% with respect to the total charge of hydrocarbon reactants. It must be noted, however, that larger amounts of catalyst may be employed if desired, although no additional advantages result therefrom.

The isobutane and propylene to be used in our process may be derived from any suitable source, as is well known in the art, and may be used either in the pure state or in admixture with other constituents not undesirable. A conventional and preferred source of isobutane and propylene is the fixed gases obtained around petroleum refineries. These fixed gases may furnish substantially all the desired isobutane and propylene, or it may be necessary or desirable to obtain additional supplies, as is well understood. Additional propylene, if required, may be formed from a portion of the paraffinic hydrocarbons in the fixed gases. On the other hand, additional isobutane may be admixed in order to increase the concentration of paraffinic hydrocarbons to a desired magnitude.

In carrying out our process, we use temperatures varying between about 750° F. and about 850° F., and, preferably, temperatures varying between about 775° F. and about 825° F. The alkylate produced under these conditions contains no more than 10% of propylene polymer and no aromatics so that the predominance of alkylation obtained thereby is a distinct feature of the process. Under appreciably higher temperature conditions, side reactions occur that substantially reduce the purity of the product obtained. Even within the preferred temperature range, side reactions occur that account for substantial portions of the total alkylate, but a fraction boiling at 79° C. to 82° C. and consisting of triptane and 2,2-dimethylpentane may be obtained. The ratio of triptane to 2,2-dimethylpentane in this fraction is 15:85. This reaction product is obtained in best yields by injecting the reactants and the catalyst separately at optimum reaction temperature into the reaction zone. The reason for these improved results appears to be that under these conditions, the homogeneous gaseous phase catalysts, or at least the organic halides and the elemental halogens, do not react with the charge or any part thereof. The method of conducting alkylation with homogeneous gaseous phase catalysts embodying these optimum conditions, forms the subject matter of a copending application, Ser. No. 516,242, filed December 30, 1943.

The pressure to be used in our process may vary from about 2500 pounds per square inch to about 6000 pounds per square inch or more, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

In our process, it is desirable, as in known isoparaffin-olefin alkylation processes, to keep the concentration of propylene relatively low during the alkylation reaction in order to eliminate as much propylene polymerization as possible. Accordingly, it is advisable to maintain the propylene concentration in the charge below about 25% by volume, and, preferably, between about 7% and about 12% by volume.

The alkylate product that we obtain distills over a fairly large boiling range, but a greater part of the alkylate, usually from about 80% to 90% distills in the boiling range of aviation gasolines. The iodine number of the aviation distillate is low, on the order of about 30 to 40. The alkylate product consists predominantly of branched paraffinic hydrocarbons.

To illustrate our invention, we set forth below in Tables I and II, typical data obtained in carrying out our process:

*Table I.—Batch operation*

|  | Run 1 | Run 2 | Run 3 | Run 4 |
|---|---|---|---|---|
| Isobutane, percent by weight | 90 | 90 | 90 | 90 |
| Propylene, percent by weight | 10 | 10 | 10 | 10 |
| Catalyst | (¹) | (²) | (³) | None |
| Amount of catalyst, weight percent in charge | 1.4 | 1.4 | 1.2 | -------- |
| Temperature, °F | 750 | 750 | 775 | 775 |
| Pressure, #/sq. in. gauge | 4,000 | 4,000 | 4,000 | 4,000 |
| Reaction time, min | 30 | 30 | 17 | 17 |
| *Product* | | | | |
| Alkylate yield, weight percent of charge | 16 | 17 | 10.7 | 2.9 |
| Alkylate, weight percent boiling between— | | | | |
| 70° C.-76° C | 4 | 4 | -------- | -------- |
| 76° C.-79° C | 4 | 5 | -------- | -------- |
| 79° C.-82° C | 31 | 17 | -------- | -------- |
| 82° C.-86° C | 0 | 2 | -------- | -------- |
| 86° C.-92° C | 4 | 12 | -------- | -------- |
| Triptane in 76° C.-86° C. fraction, percent | 15 | 15 | 15 | 2-5 |

¹ 1,2,3-tribromo propane.
² 1,2,3-trichloro propane.
³ Propylene chloride.

*Table I.—Continued*

|  | Run 5 | Run 6 | Run 7 | Run 8 | Run 9 |
|---|---|---|---|---|---|
| Isobutane, percent by weight | 90 | 90 | 90 | 90 | 90 |
| Propylene, percent by weight | 10 | 10 | 10 | 10 | 10 |
| Catalyst | (¹) | (¹) | (¹) | (¹) | (¹) |
| Amount of catalyst, weight percent in charge | 1.2 | 1.25 | 1.25 | 1.25 | 1.2 |
| Temperature, °F | 750 | 775 | 800 | 825 | 850 |
| Pressure, #/sq. in. gauge | 6,000 | 6,000 | 6,000 | 6,000 | 6,000 |
| Reaction time, min | 25 | 25 | 25 | 25 | 25 |
| *Product* | | | | | |
| Alkylate yield, weight percent of charge | 11 | 14.8 | 16.3 | 15.9 | 14.3 |
| Triptane in 76° C.-86° C. fraction, percent | 14 | 14 | 14 | 15 | 14 |

¹ 1,2,3-trichloro propane.

*Table II.—Continuous operation*

|  | Run 10 | Run 11 | Run 12 | Run 13 |
|---|---|---|---|---|
| Isobutane weight in grams | 2,142 | 2,304 | 2,310 | 2,526 |
| Propylene weight in grams | 238 | 226 | 250 | 244 |
| Catalyst | None | 226 | 250 | 244 |
| Temperature, °F | 775 | 226 | 250 | 244 |
| Pressure, #/sq. in. gauge | 3,000 | 4,000 | 5,000 | 6,000 |
| *Product* | | | | |
| Alkylate weight in grams | 69 | 68 | 102 | 58 |
| Ratio of alkylate to propylene | 0.29 | 0.30 | 0.40 | 0.65 |

*Table II.—Continued*

|  | Run 14 | Run 15 | Run 16 | Run 17 |
|---|---|---|---|---|
| Isobutane weight in grams | 2,783 | 2,671 | 2,668 | 2,659 |
| Propylene weight in grams | 287 | 299 | 302 | 291 |
| Catalyst | (¹) | 299 | 302 | 291 |
| Temperature, °F | 775 | 299 | 302 | 291 |
| Pressure, #/sq. in. gauge | 3,000 | 4,000 | 5,000 | 6,000 |
| *Product* | | | | |
| Alkylate weight in grams | 201 | 319 | 385 | 443 |
| Ratio of alkylate to propylene | 0.70 | 1.07 | 1.27 | 1.52 |

¹ Propylene dichloride.

It must be noted that run 2 which was made under identical conditions as run 1 with the exception that 1,2,3-trichloropropane was used, gave an alkylate containing only 17% by weight of the triptane- and 2,2-dimethylpentane-containing fraction boiling at 79° C. to 82° C., as compared to 31% obtained in run 1.

Run 4 which was made under identical conditions as run 3, with the exception that no catalyst was used, gave only 2.9% by weight on the charge of alkylate as compared to 10.7% obtained in run 3.

The alkylate produced by our process is contaminated by various halogen compounds which are present in small concentration. These compounds cause a negative susceptibility to tetraethyl lead, and therefore, should be removed. Removal of these halogen compounds is possible in a variety of ways, as set forth in copending applications Ser. No. 477,450, filed February 27, 1943; Ser. No. 502,504, filed September 15, 1943; and Ser. No. 504,436, filed September 30, 1943.

Although the present invention has been described in conjunction with preferred embodiments, it is to be understood that modifications and variations may be resorted to without departing from the spirit and scope of the invention, as those skilled in the art will readily understand. Such variations and modifications are

We claim:

1. The process of alkylating isobutane with propylene, which comprises contacting isobutane with propylene, in gaseous phase, in a reaction zone under alkylating conditions including a temperature varying between about 750° F. and about 850° F. and a pressure in excess of about 2500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said isobutane and with said propylene, a single, homogeneous gaseous phase under said alkylating conditions, and maintaining the isobutane in excess over the propylene in said reaction zone so that alkylation is the principal reaction.

2. The process of claim 1 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

3. The process of claim 1 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

4. The process of claim 1 wherein the alkylation catalyst consists essentially of a material selected from the group consisting of chlorinated naphtha and brominated naphtha.

5. The process of claim 1 wherein the alkylation catalyst consists essentially of isobutylene dibromide.

6. The process of manufacturing triptane, which comprises contacting isobutane with propylene, in gaseous phase, in a reaction zone under alkylating conditions including a temperature varying between about 775° F. and about 825° F. and a pressure in excess of about 2500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said isobutane and with said propylene, a single, homogeneous gaseous phase under said alkylating conditions, in amounts of at least 0.5% by weight based on the total weight of said isobutane and said propylene, and maintaining the isobutane in excess over the propylene in said reaction zone so that alkylation is the principal reaction.

7. The process of claim 6 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

8. The process of claim 6 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

9. The process of claim 6 wherein the alkylation catalyst consists essentially of a material selected from the group consisting of chlorinated naphtha and brominated naphtha.

10. The process of claim 6 wherein the alkylation catalyst consists essentially of isobutylene dibromide.

11. The process of manufacturing high octane gasoline, which comprises contacting isobutane with propylene, in gaseous phase, in a reaction zone under alkylating conditions including a temperature varying between about 750° F. and about 850° F. and a pressure in excess of about 2500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said isobutane and with said propylene, a single, homogeneous gaseous phase under said alkylating conditions, in amounts varying between about 0.5% and about 3% by weight based on the total weight of said isobutane and said propylene, and maintaining the isobutane in excess over the propylene in said reaction zone so that alkylation is the principal reaction.

12. The process of claim 11 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

13. The process of claim 11 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

14. The process of claim 11 wherein the alkylation catalyst consists essentially of a material selected from the group consisting of chlorinated naphtha and brominated naphtha.

15. The process of claim 11 wherein the alkylation catalyst consists essentially of isobutylene dibromide.

AARON W. HORTON.
JOHN W. BROOKS.
ARLIE A. O'KELLY.